United States Patent [19]

Boxler

[11] Patent Number: 5,707,696
[45] Date of Patent: Jan. 13, 1998

US005707696A

[54] SCENTED PLASTIC ARTICLE AND METHOD FOR PRODUCING SAME

[75] Inventor: Charles R. Boxler, Roanoke, Va.

[73] Assignee: NSW Corporation, Inc., Roanoke, Va.

[21] Appl. No.: 472,034

[22] Filed: Jun. 6, 1995

[51] Int. Cl.$^6$ ........................................ B32B 9/00
[52] U.S. Cl. ............ 428/36.5; 428/35.3; 428/311; 428/316.6; 428/317.9; 428/402.2; 428/423.7; 428/474.4; 521/79; 521/99; 264/146; 264/209.1
[58] Field of Search ........................ 428/905, 423.7, 428/36.5, 316.6, 317.9, 402.2, 35.3, 311, 474; 264/146, 209.1; 521/79, 99

[56] References Cited

U.S. PATENT DOCUMENTS

| | | | |
|---|---|---|---|
| 4,254,179 | 3/1981 | Carson, III et al. | 428/311 |
| 4,990,381 | 2/1991 | Holzner | 428/35.3 |
| 5,109,029 | 4/1992 | Malone | 521/79 |
| 5,122,401 | 6/1992 | Finkelstein | 428/36.5 |
| 5,422,078 | 6/1995 | Colon | 422/123 |

*Primary Examiner*—Patrick Ryan
*Assistant Examiner*—Abraham Bahta

[57] ABSTRACT

A scented plastic material such as a mesh net or scented bathing implement and method for producing same is taught. Briefly stated, a scented additive is simultaneously extruded with a plastic raw material in order to form an intermediate or raw stock. The intermediate or raw stock thereby has a particular scent or fragrance associated therewith and is embedded therein. The intermediate product is thereafter formed into a suitable end product.

14 Claims, 2 Drawing Sheets

SCENTED PLASTIC ARTICLE AND METHOD FOR PRODUCING SAME

FIELD OF THE INVENTION

This invention relates, generally, to a netting mesh and more particularly to a scented netting mesh and method for producing same which may be used for items such as an oriented plastic mesh bag or plastic sponge in the Health and Beauty Aid industry.

BACKGROUND OF THE INVENTION

It is well known that netting manufacturers use plastic net for various end uses. Such end uses are generally in the form of packaging which ultimately contain produce, toys, other types of food, parts and the like. They are also used to protect or collect items from damage in industrial applications during manufacturing as well as being used in the health and beauty aid industry. Therefore, the mesh is necessarily of varying sizes while the plastic make-up and colors will vary according to the particular need of the end user.

In addition to the diverse number of applications to which this net is utilized, one of the primary driving forces for use is the fact that this is relatively inexpensive to manufacture, process and utilize. This therefore makes net type packaging ideally adaptable and usable in a number of applications with the result that their use is frequently being increased.

Additionally, in the packaging and point of sale industry there is an increased use of creative types of packaging and displays in order to differentiate one product over another in an increasingly competitive world. One such competitive advantage is the attempt to utilize fragrances. These are used for a variety of reasons such as, for example, to enhance the natural fragrance of an item, to complement the natural fragrance of an item, or alternatively to mask the fragrance of an item, all of which attempt to entice a consumer into purchasing the product. One such type of use has been in the area of what is known as "blown film" for trash bags where a disinfectant or more pleasant fragrance is utilized to mask the smell of trash which may be contained therein. However, this has only found limited applications since it is not always necessary or desirable to enclose an item in a standard plastic bag.

Other known uses of fragrances have been accomplished by spraying same onto a finished bag, bathing implement or package. However, this necessarily requires an additional step in the manufacturing process. More importantly, spraying on or otherwise applying a fragrance to a package may render the product unhealthy to consume. Moreover, the metering of such fragrances is extremely unreliable in controlled minute amounts. Moreover, separate application of fragrances necessarily increases the cost to the end user or customer since they must be applied at some intermediate step rather than during the manufacture of the material. Further, merely spraying on a fragrance has a tendency to dissipate in its effectiveness since the fragrance is frequently rubbed off or evaporate over time.

Other methods of utilizing fragrances has been accomplished by utilizing discrete packets of fragrances which must then be placed into the bag or alternatively attached to the product, although even this is not acceptable when depositing a fragrance onto a sponge or a bathing implement. However, this suffers from many of the same deficiencies as recited above in that simply "adding" the fragrance directly to the end product increases cost, may contaminate the product, etc.

It is therefore an object of the present invention to produce a netting mesh which has the fragrance embedding directly therein.

It is still a further object of the present invention to produce a netting mesh where such fragrance is embedded therein during the initial manufacturing process.

Another object of the present invention is to produce a netting mesh that does not require additional manufacturing steps.

A further advantage and object of the present invention is to produce a netting mesh which does not require separate applications.

A still further object of the present invention is to produce a netting mesh having a fragrance which does not contaminate the items ultimately contained therein.

Yet another object of the present invention is to produce a netting mesh having a fragrance which does not rapidly dissipate over a period of time.

Still another object of the present invention is to produce a netting mesh having a fragrance whereby the amount of fragrance may be precisely controlled thereby eliminating the likelihood of excessive or inadequate amounts of fragrance.

Still a further object of the present invention is produce a scented plastic material, comprising a first material suitable for extrusion; a second material, the second material being a fragrance and further being suitable for simultaneous extrusion with the first material, wherein the first and the second material, when simultaneously extruded form a scented intermediate material.

Yet another object of the present invention is a method for producing a scented intermediate material comprising the steps of adding a first plastic material such as polyolefin to an extruding machine; adding a scented second material to the extruding machine; and simultaneously extruding the first plastic material and the scented second material so as to form a scented material which may thereafter be formed into, for example, a mesh net or a sponge or bathing implement.

BRIEF DESCRIPTION OF THE DRAWINGS

Reference may be now had to the accompanying drawings in which.

DETAILED DESCRIPTION OF THE PREFERRED EMBODIMENT

Figure 1:
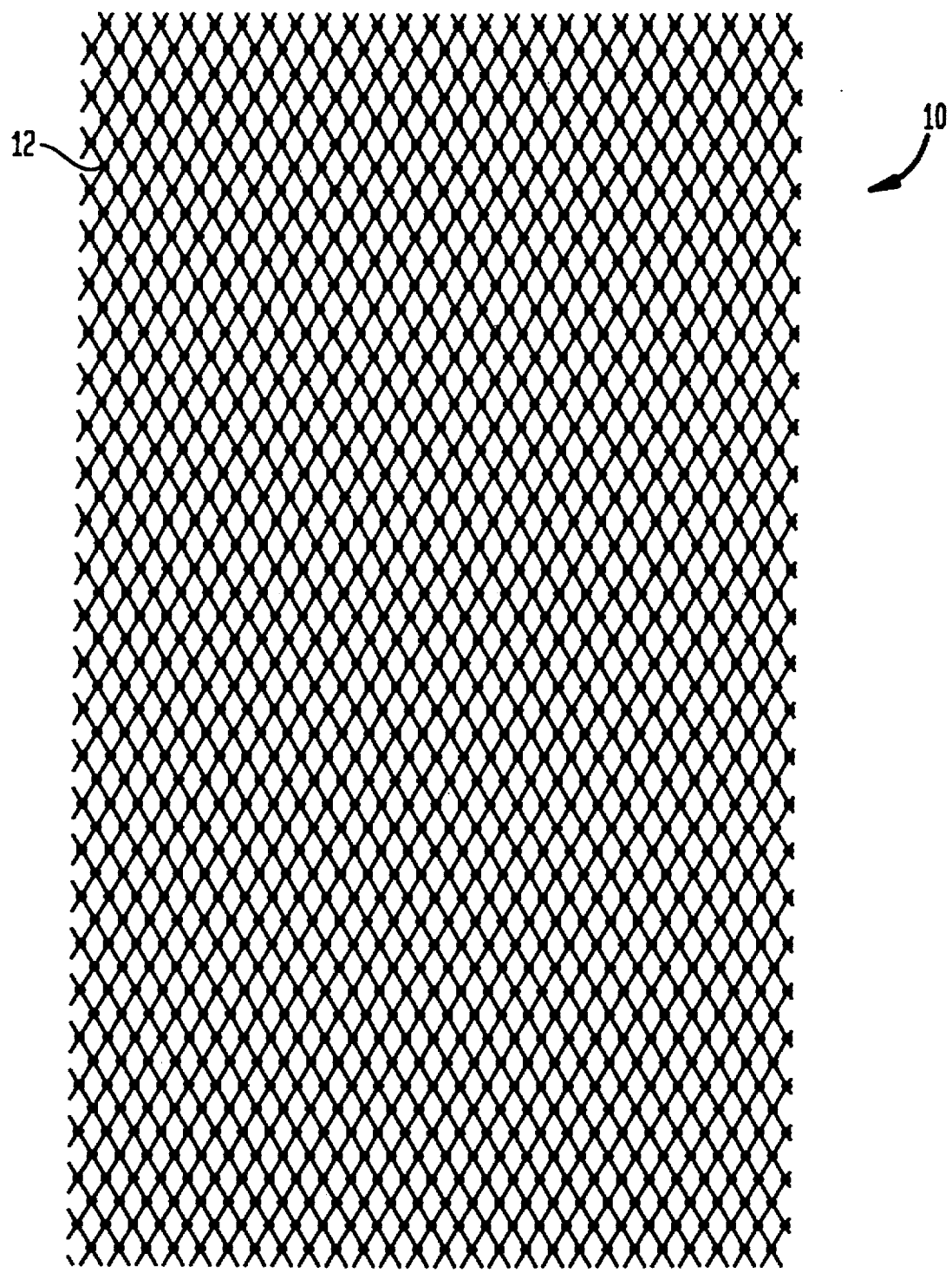
FIG. 1 is a plan view of a plastic mesh as described in the preferred embodiment of the present invention.

Referring now to FIG. 1 there is shown a plan view of an exemplary mesh bag produced according to the present invention. Here it can be seen that the netting mesh 10 is comprised of an oriented plastic mesh 12. It is to be remembered that although the oriented plastic mesh 12 of the present invention is shown of a particular proportion, any plastic make up may be utilized as well as any color without departing from the spirit and scope of the present invention.

Figure 2:
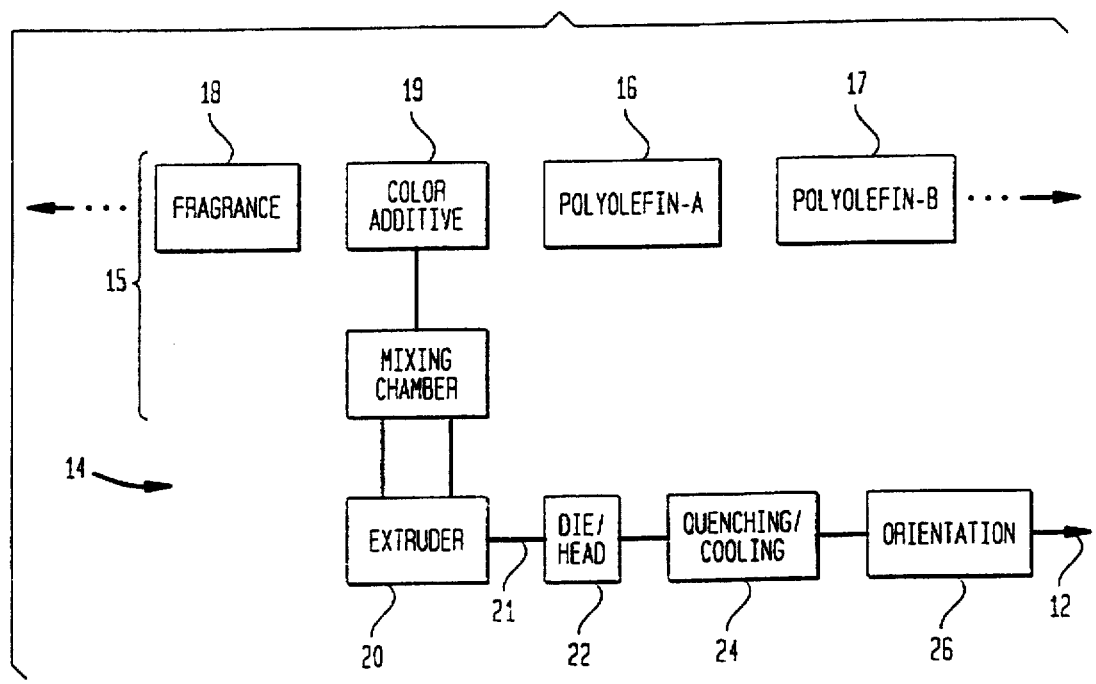
FIG. 2 is a schematic diagram illustrating manufacturing by extrusion of a scented plastic intermediate material and an exemplary oriented plastic mesh according to one embodiment of the present invention.

Referring now to FIG. 2 there is shown a schematic diagram of the manufacturing process according to one embodiment of the present invention. In the preferred embodiment of the present invention, a scented compound or material 18 is co-mixed with a first raw material 16, polyolefin A, a color additive 19 (if so desired) and a second raw material 17 which may be a polyolefin B. In the preferred embodiment of the present invention, scented compound 18 may be acquired from a plurality of manufacturers utilizing well known International Fragrance and Flavors (IFF) as well as Aromatic Flavors and Fragrances (AFF). Further, different colors or no colors may be utilized while Polyolefin B may be eliminated or additional Polyolefins may be used. Additionally, other suitably materials may be added according to the desired attributes of the end product (not shown).

The scented material 18, color 19 and polyolefins A and B, 16,17 respectively are introduced into the additive process equipment shown generally at 14 and specifically the extruding machine 20 by standard and known methods of metering. In this fashion, the amount of and hence strength of a fragrance can be adjusted. Further, although not shown, it is to be understood that more than one scented material 18 may be added without departing from the spirit and scope of the present invention.

The metering machine 15 (which is formed by the mixing chamber and the hoppers to which ingredients 16, 17, 18 and 19 are introduced) is produced by a number of manufacturers such as, for example, Conair Franklin Company of Pennington, N.J. or K-Tron/Colortronics of Pitman, N.J. These types of machines, depending upon their configuration, will accept color 19, and raw materials 16,17 in any common or suitable form such as, for example, pellets or liquid while scented material 18 may similarly be in suitable forms such as oil or resin. Further, the orientation of the equipment shown in FIG. 2 may be in different configurations such as, for example, vertical without departing from the spirit and scope of the present invention.

The materials 16, 17, 18 and 19 are then preferably introduced into a mixing chamber shown at 15 in order to thoroughly mix and distribute the various components. However, it is to be understood that a mixing chamber need not be utilized as long as metering at the hoppers is done correctly. Thereafter, the contents of mixing chamber are introduced to extruding machine 20. Extruding machine 20, through well known techniques simultaneously extrudes components 16, 17, 18 and 19 thereby producing extruded raw stock 21, which may be considered an intermediate product. In the preferred embodiment of the present invention, the intermediate product is an extruded raw stock which may be suitable for use as a packing material or later formed into a netting mesh such as 10 according to the various netting mesh or oriented plastic mesh 12 according to individual user or customer requirements and by techniques well known to one skilled in the art. Such packing and packaging/netting material when in its raw state I shall refer to as a scented intermediate material 21.

Thereafter, in one embodiment of the present invention, scented intermediate material 21 is introduced to Die/Head 22 and thereafter to a quenching/cooling chamber 24. The now cooled scented material is then introduced into orientation module 26 which in this form of the preferred embodiment is used to form an oriented plastic mesh such as 12. However, it is to be understood that scented intermediate material 21 may also be used, through suitable equipment (not shown), which is readily known and available to those skilled in the art into, for example, a scented kitchen sponge or a bathing or cleaning sponge/implement.

It is to be understood that many variations may be practiced by the present invention without departing from the spirit and scope of the present invention. For example, more than one type of scented material may be added.

Additionally, other processes or equipment for combining raw and scented material 16, 17, 18 and 19 into an intermediate product 21 may be utilized without departing from the spirit and scope of the present invention. Further, other types of fragrances other than IFF and AFF may be utilized while different types of end products other than netting mesh or oriented plastic mesh may be manufactured such as, for example, packing material. Also, only a portion of the package may have scent thereon. In this fashion, the scented intermediate product may form the entire package or only a portion thereof without departing from the spirit and scope of the present invention.

What is claimed is:

1. A scented plastic material comprising a plastic netting mesh for containing objects, said mesh being made from a mixture of an extrudable plastic material and an extrudable fragrance material.

2. The scented plastic material according to claim 1, wherein said plastic netting mesh comprises an oriented plastic netting mesh.

3. The scented plastic material according to claim 1, wherein said extrudable plastic material comprises a polyolefin.

4. The scented plastic material according to claim 1, wherein said extrudable fragrance material comprises an oil.

5. The scented plastic material according to claim 1, wherein said extrudable fragrance material comprises a resin.

6. A method for making a scented plastic netting mesh for containing objects comprising the steps of:

mixing an extrudable plastic material with an extrudable fragrance material to form a mixture of said extrudable plastic material and said extrudable fragrance material;

extruding said mixture into a scented plastic material; and forming said scented plastic material into said scented plastic netting mesh.

7. The method according to claim 6, wherein said scented plastic netting mesh comprises an oriented plastic netting mesh.

8. The method according to claim 6, wherein said extrudable plastic material comprises a polyolefin.

9. The method according to claim 6, wherein said extrudable fragrance material comprises an oil.

10. The method according to claim 6, wherein said extrudable fragrance material comprises a resin.

11. A scented plastic material comprising a scented sponge made from a mixture of an extrudable plastic material and an extrudable fragrance material.

12. A method for making a scented sponge comprising the steps of:

mixing an extrudable plastic material with an extrudable fragrance material to form a mixture of said extrudable plastic material and said extrudable fragrance material;

extruding said mixture into a scented material; and forming said scented material into said scented sponge.

13. A scented plastic material comprising a plastic netting mesh for containing objects, said mesh being made from a mixture consisting of an extrudable plastic material and an extrudable fragrance material.

14. A scented plastic material comprising a scented sponge made from a mixture consisting of an extrudable plastic material and an extrudable fragrance material.

* * * * *